(12) United States Patent
Chasseguet et al.

(10) Patent No.: US 6,378,676 B1
(45) Date of Patent: Apr. 30, 2002

(54) HYDROKINETIC COUPLING APPARATUS FOR LOCKING ENGAGEMENT

(75) Inventors: Gustave Chasseguet, Taverny; Frédéric Sauvage, Le Kremlin Bicetre, both of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/508,003

(22) PCT Filed: Jul. 7, 1999

(86) PCT No.: PCT/FR99/01699
§ 371 Date: Jun. 8, 2000
§ 102(e) Date: Jun. 8, 2000

(87) PCT Pub. No.: WO00/01962
PCT Pub. Date: Jan. 13, 2000

(30) Foreign Application Priority Data
Jul. 7, 1998 (FR) .............................. 98 08674

(51) Int. Cl.[7] .............................................. F16H 45/02
(52) U.S. Cl. ...................... 192/3.29; 192/3.28; 192/205
(58) Field of Search ............................. 192/3.28, 3.29, 192/55.61, 212, 205; 464/66, 67

(56) References Cited

U.S. PATENT DOCUMENTS

| | | | |
|---|---|---|---|
| 4,123,905 A | 11/1978 | Posega, Jr. | |
| 5,465,575 A | * 11/1995 | Shimmell | .................... 60/345 |
| 5,507,622 A | 4/1996 | Avny | |
| 5,720,595 A | * 2/1998 | Avny | ........................... 416/180 |
| 5,761,970 A | 6/1998 | Bonfilio | |
| 6,056,092 A | * 5/2000 | Hinkel | ...................... 192/3.29 |
| 6,056,093 A | * 5/2000 | Hinkel | ...................... 192/3.29 |

FOREIGN PATENT DOCUMENTS

| | | |
|---|---|---|
| FR | 2616184 A | 12/1988 |
| FR | 2634849 A | 2/1990 |
| FR | 2674306 A | 9/1992 |
| FR | 2724434 A | 3/1996 |
| WO | WO 9313339 A | 7/1993 |
| WO | WO 9614526 A | 5/1996 |

* cited by examiner

*Primary Examiner*—Rodney H. Bonck
(74) *Attorney, Agent, or Firm*—Liniak, Berenato, Longacre & White

(57) ABSTRACT

The invention concerns a plate clutch device (5) for locking or unlocking an elastic coupling between said turbine wheel (1) and a radial wall (2a) of said case, via a set of helical shock absorber springs (22) with circumferential action held in place in the arc-shaped housings (24) integral with the turbine wheel (1) and opening in axial direction towards the radial wall (2a). The housings (24) are directly arranged in the thickened peripheral part (25) of the turbine wheel (1) made of mouldable material which for example can be overmoulded on a central metal disc (23) for connection with the driven shaft, the opposite radial ends (26) of the housings (24) acting as supports for the corresponding ends of the springs (22).

7 Claims, 5 Drawing Sheets

HYDROKINETIC COUPLING APPARATUS FOR LOCKING ENGAGEMENT

The present invention relates to a hydrokinetic coupling apparatus with a lock-up clutch. In particular, it relates to a hydrokinetic coupling apparatus, including a turbine wheel which is capable of being coupled fixedly to a driven shaft and which is mounted within an impulse wheel casing, with which it is able to cooperate for the hydrokinetic transmission of a torque to the said driven shaft from a driving shaft which is able to be coupled fixedly to the said impulse wheel, the said apparatus further including a clutch device having a clutch disc, being a so-called lock-up clutch, adapted to lock or unlock an elastic coupling between the said turbine wheel and a radial wall of the said casing. This coupling consists of a set of circumferentially acting helical damping springs which are held in place in arched seatings which are fixed with respect to the said turbine wheel and which are open in an axial direction towards the said radial wall.

Such an apparatus is described for example in the Application WO93/13339 of Oct. 30, 1992; French patent application (FR-A-2 726 620) No. 94 13205 of Jan. 4, 1994 in the name of the Applicant is more particularly concerned with the lock-up clutch which, as is known, prevents any sliding movement between the impulse wheel and the turbine wheel except during starting phases, which leads to fuel economy.

In the first of the said documents, the helical damping springs are held in annular housings in the form of toroidal sectors defined by the curved peripheral edge of a sheet metal disc which is riveted on the turbine wheel, which involves relatively complicated fabrication (bending of sheet metal, forming through holes, etc.).

The object of the present invention is to simplify this technology.

To this end, a hydrokinetic coupling apparatus of the type described at the beginning hereof is characterised in that the said arched seatings are formed directly in the thickened peripheral portion of a turbine wheel made of mouldable material, the opposed radial ends of the said seatings serving as abutments for the corresponding ends of the said springs.

The said mouldable material could for example be synthetic material or aluminium.

In this way, the number of components is considerably reduced and the fabrication process is greatly simplified, while the weight of the turbine wheel is reduced. It also goes without saying that this new technology enables the same type of means as in the first of the above mentioned documents to be used if necessary, to ensure transmission of the torque between the clutch disc mentioned above and the helical springs, for example through lugs of the disc or through axially bent lugs of an intermediate disc which is driven in rotation by that disc, the said lugs being able to be put in both cases into engagement against the ends of the said helical springs.

The turbine wheel may be made entirely of a moulded material, including its hub for connection to the said driven shaft. In other words, the turbine wheel is then made entirely by moulding integrally with the hub,.and in that case, in order to avoid embedding in the aluminium or the synthetic material, the said hub preferably comprises a metallic insert in which splines are formed for coupling it in rotation with the driven shaft.

In another version, it can also be arranged that the said mouldable material is moulded in situ on a central metallic disc for connection to the said driven shaft.

In order to prevent the springs mentioned above from becoming embedded in the mouldable material, it can also be arranged that the said radial ends of the seatings and/or their external walls consist of metallic thrust pieces on which the said mouldable material is moulded.

It can further be arranged, with the same end in view, that each of the said seatings consists entirely of a metallic insert, with the mouldable material of the turbine wheel being moulded in situ on the inserts.

Ways of carrying out the invention will now be described by way of example, not in any way limiting, with reference to the Figures of the attached drawings, in which.

Figure 1:
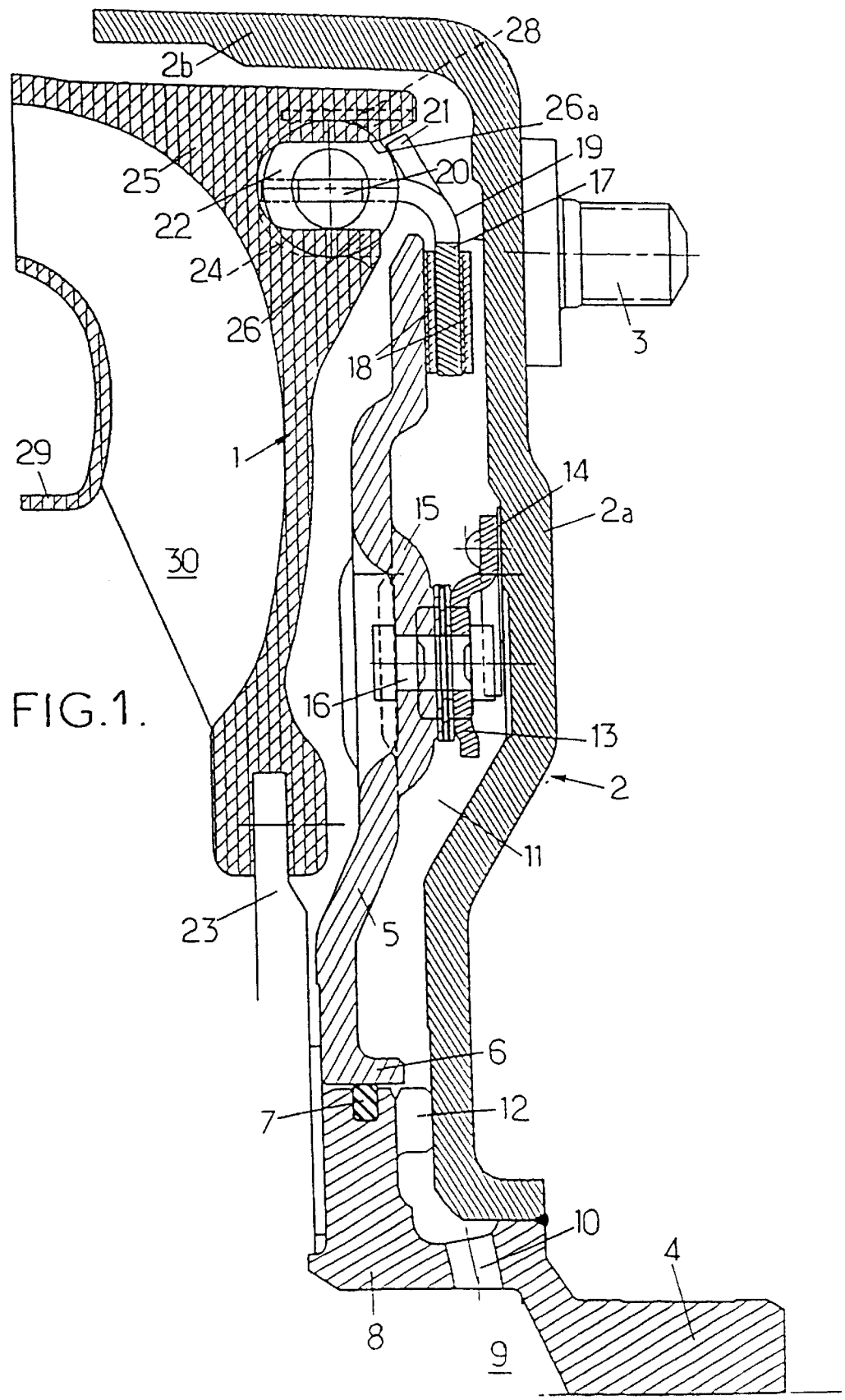
FIG. 1 is a half view in partial axial cross section showing the clutch device and the turbine wheel of a hydrokinetic coupling apparatus in accordance with the invention, the coupling between the clutch disc and the ends of the helical springs being obtained by means of an intermediate disc.

In the embodiment of FIG. 1, the bladed turbine wheel has been given the general reference numeral 1, and the radial wall of the casing 2 which is fixed to the impulse wheel has been given the general reference numeral 2a. The said radial wall 2a is extended axially at 2b so as to be joined, for example by means of a peripheral weld seam, to a complementary part (not shown) which constitutes the bladed impulse wheel, and the assembly can be mounted on a driving shaft, for example the crankshaft of an internal combustion engine. One of the studs, whereby the casing 2, which is referred to as the impulse wheel casing, is secured on the flywheel of the engine through an interposed radial plate, not shown, is shown at 3 on the radial wall 2a, the reference 4 designating a centring shaft which is welded on the same radial wall 2a. The reaction wheel, which acts during the so-called "conversion" phase, while the turbine wheel is being brought up to speed, is not shown in the drawings since it plays no part in an understanding of the invention, and its principle of operation is known for example from the document WO93/13339 mentioned above, to which reference should be made for more detail about the assembly consisting of the turbine wheel, the impulse wheel, and the reaction wheel which constitutes a coupling apparatus. In another version, this apparatus consists only of a turbine wheel and an impulse wheel.

In a manner which is also known, a clutch device extends radially between the turbine wheel 1 and the radial wall of the casing 2 of the impulse wheel, in order to couple together in rotation, or to lock up, the latter with the turbine wheel 1, thereby preventing any sliding movement between them, by "bypassing" the hydrokinetic coupling when the process of bringing the turbine wheel 1, coupled to the driven shaft, namely the input shaft of the transmission, up to speed has finished. The clutch device includes, for this purpose, for example and in the embodiment of FIG. 1, a clutch disc in the form of a piston 5 which includes a central bush 6, by means of which it is able to slide axially and sealingly (with an annular seal 7) on a sleeve portion 8 of the centring shaft 4. Within the shaft 4, a blind space 9 exists which can be filled with fluid under pressure and which is in communication, through passages 10 in the shaft 4, with a chamber 11 defined between the disc 5 and the radial wall 2a. The reference 12 designates fingers of the sleeve 8 which have a cylindrical external surface for guiding the bush 6 of the disc 5, while allowing the pressurised fluid to pass between the space 9 and the chamber 11.

In a way that is also known, the disc 5 is fixed in rotation to the radial wall 2a of the casing 2 of the impulse wheel, in such a way as to allow relative axial displacements to take place between these two elements. This coupling may be obtained by any appropriate means, for example with elastic tongues 13 which are riveted at 14 on the wall 2a and which are also fixed on bosses 15 of the disc 5 by means of any gripping system, 16, whatever, in such a way as to exert an axial tractive force on the said disc towards the radial wall 2a. A device of this type is described for example in French patent No. 94 13205 of Nov. 4, 1994 in the name of the Applicant.

Figure 2:
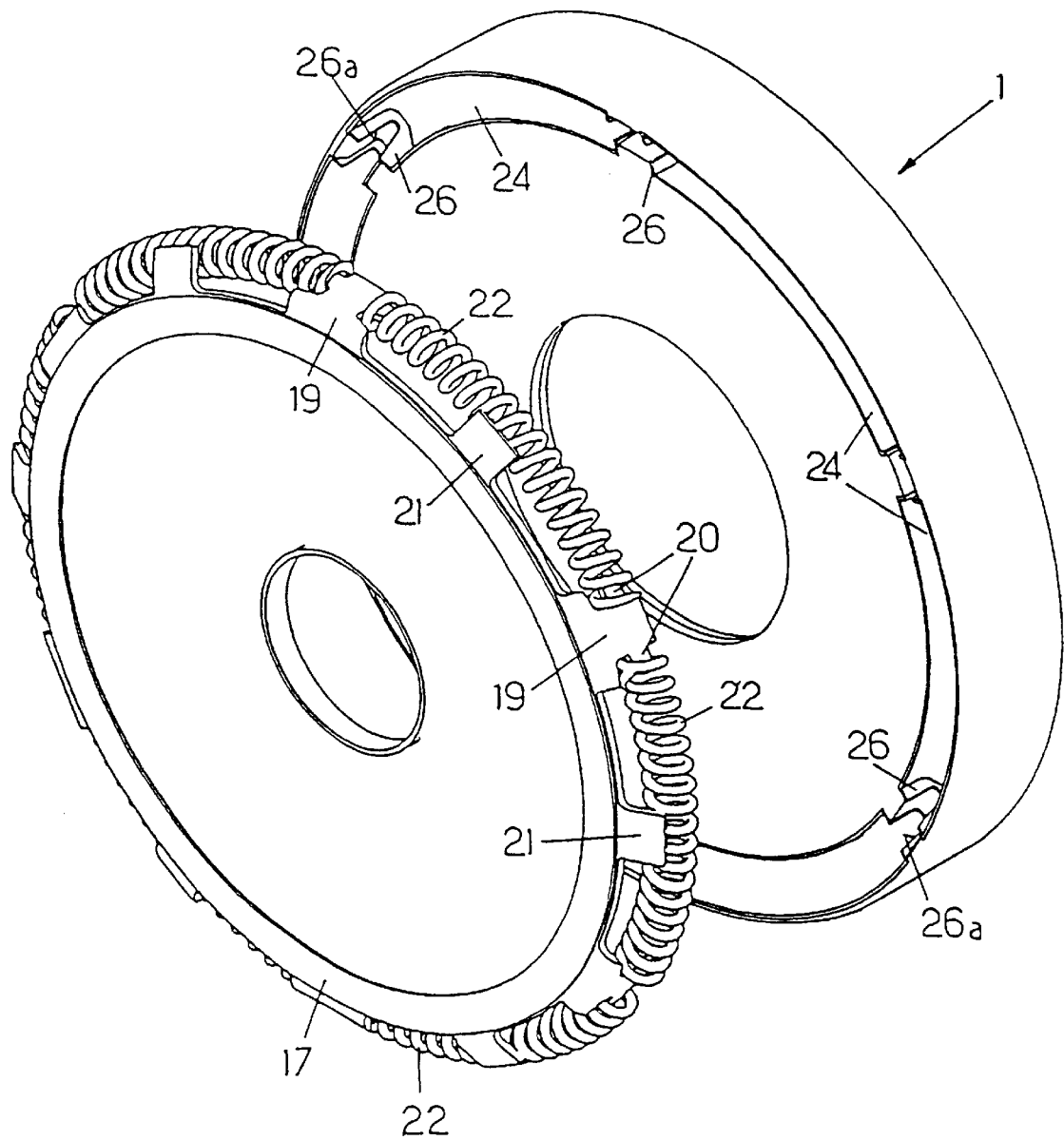
FIG. 2 is an exploded perspective view showing firstly the liner support disc of the clutch device, which is provided with coupling springs, and secondly, the turbine wheel which is provided with its seatings.
Figure 3:
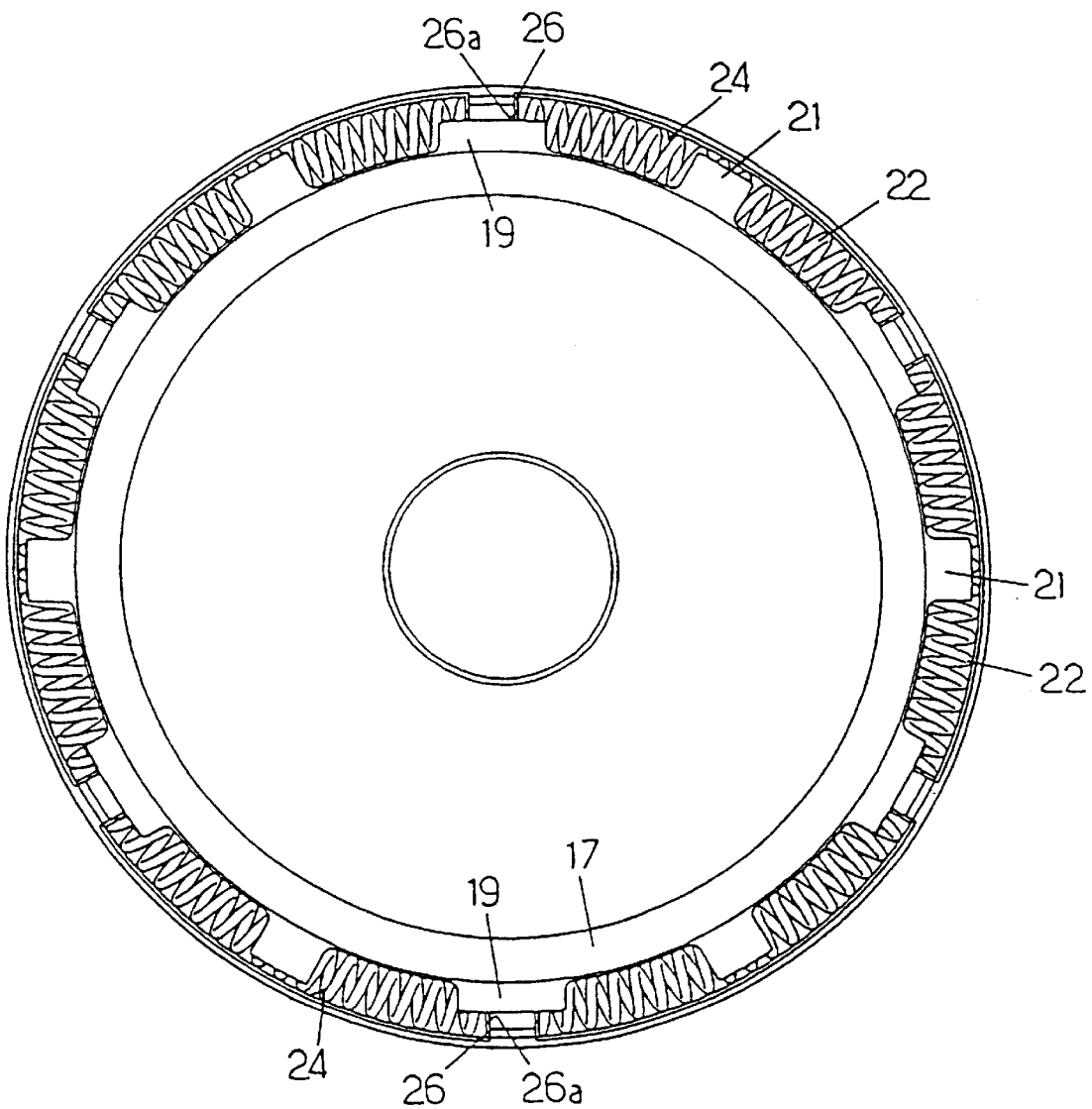
FIG. 3 shows the same assembly as FIG. 1, seen from the front.

The clutch device also includes an intermediate disc 17 which, on both its faces, carries friction liners denoted 18 (see also FIGS. 2 and 3). The disc 17 includes, extending its outer edge, and spaced apart equidistantly in the circumferential direction around its periphery, firstly, hooking lugs 18 bent back at right angles and each carrying two lateral ears 20 extending circumferentially, and secondly, retaining lugs 21 which are bent in the same direction as the foregoing, that is to say towards the turbine wheel, but at an obtuse angle. Thus, this intermediate disc 17 serves at the same time as a carrier disc for helical damping springs 22: the opposed ends of each spring are engaged in each case in the ears 20, which are directed towards each other, of two adjacent lugs 19, while the central portion of the spring 22 concerned is held by the lug 21 situated at an equal distance from the lugs 19. Thus each spring 22 is held at once in the circumferential direction and in the axial direction against the forces which would tend to separate it from the turbine wheel 1.

In order to ensure transmission of the torque between the intermediate disc 17 and the turbine wheel 1, the springs 22 must also be located, at their ends and radially, in arched seatings of corresponding form which are formed in the turbine wheel. For this purpose, and in accordance with the invention, the turbine wheel 1 is made of aluminium, or preferably of a synthetic material which may be reinforced with strengthening fibres (glass, carbon, "Kevlar", etc.), and is moulded in situ in this example on a central metallic disc 23 for connection to the driven shaft (not shown), with arched seatings 24 for the springs being formed, during the moulding operation, within a peripheral thickened portion 25 of the wheel 1.

Preferably, the opposed radial ends 26, 26a of the seatings 24 consist of metallic thrust pieces which prevent the ends of the springs 22 from becoming embedded in the moulded material of the wheel 1. These metallic thrust pieces are positioned within the mould in such a way that the synthetic material or the like is moulded on them, which also contributes to simplification of manufacture. It is possible also to prevent embedding in the outer wall of the arched seatings 24 under the effect of centrifugal force from the springs 22, by providing further metallic thrust pieces which are formed by in situ moulding at 28 in this position (see FIG. 1).

It should be noted that the curved wall 29 which constitutes the inner toroidal portion of the turbine wheel 1 may itself also be made of aluminium or in a synthetic material, which is adhesively bonded, moulded in situ, or welded on the blades 30. Operation of the coupling apparatus which has just been described is the same as that of conventional apparatus, and is only recapitulated here by way of reminder: in the starting phase, the pressure of the hydraulic fluid in the chamber 11 is such that it maintains the clutch disc 5 spaced away from the radial wall 2a, in such a way that the liners 18 of the intermediate disc 17, which are spaced from the wall 2a, are not driven in rotation, notwithstanding the rotation (permanent) of the disc 5. The torque from the impulse wheel is therefore transmitted to the turbine wheel 1, with sliding, solely by hydrokinetic effect in the apparatus (conversion phase). The springs 22 are inactive, and the clutch device is then disengaged, or separated.

When the turbine wheel 1 is no longer accelerating, pressure is released in the hydraulic fluid in the chamber 11, and the spring tongues 13 cause the clutch disc 5 to slide towards the radial wall 2a, which presses the liners 18 of the intermediate disc 17 between the disc 5 and the internal face of the said wall 2a, these two components being driven in permanent rotation by the impulse wheel, and the clutch device being therefore engaged or locked up. With the damping of torque due to the springs 22, the turbine wheel 1 is thus driven rapidly at the same speed as the impulse wheel, with all sliding effects disappearing. The springs 22 prevent any torsional jerking, because they can be each compressed between a radial end wall 26 of the seatings 24 and the corresponding profiled lug 19 of the intermediate disc (as can be seen clearly in FIGS. 1 and 2, with the walls 22 having a central notch 26a for passage of the lugs 19).

Figure 4:
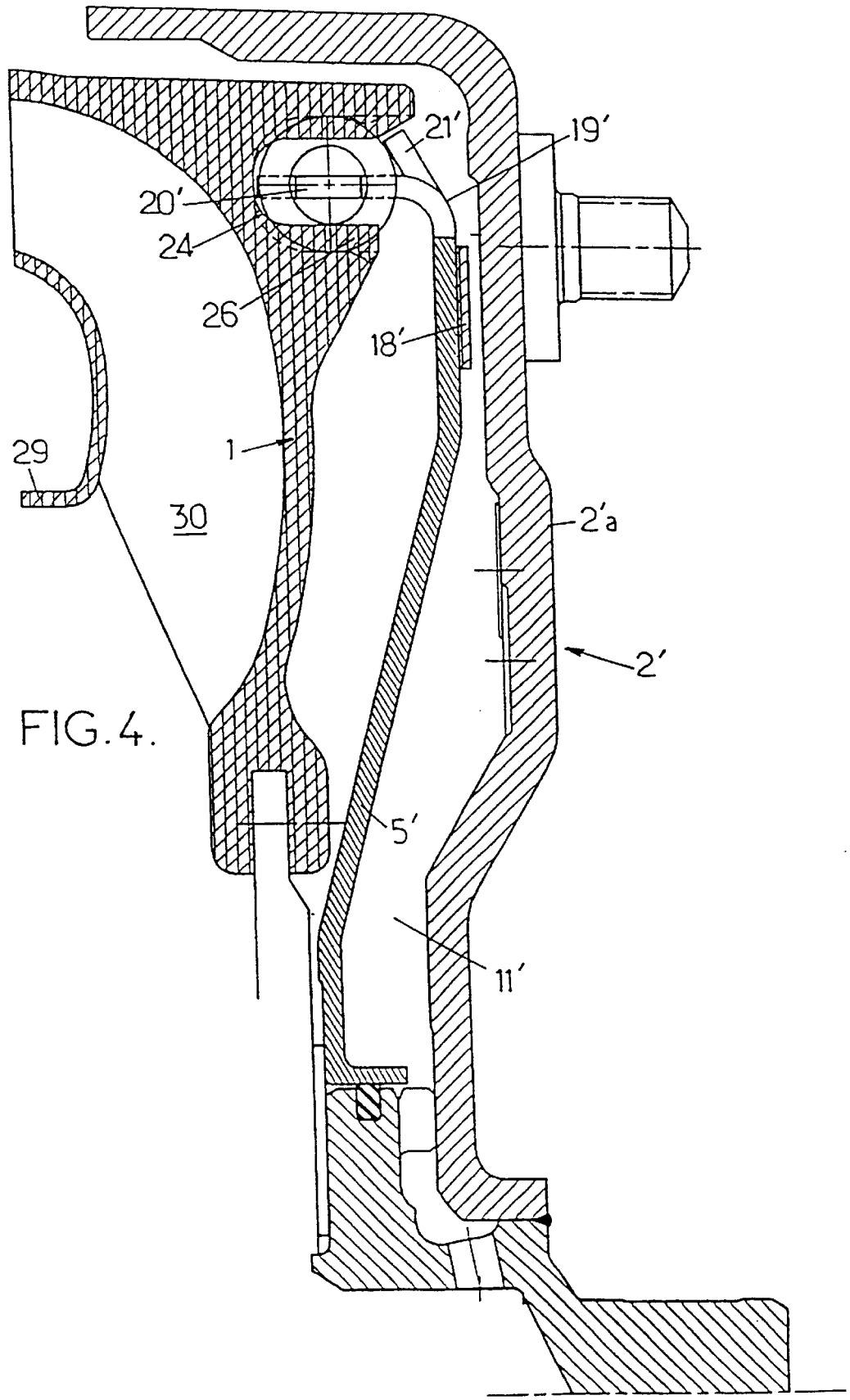
FIG. 4 is a view similar to that in FIG. 1, showing a simplified variant of the clutch device.

The variant shown in the embodiment of FIG. 4 concerns only the clutch device and will therefore only be briefly described. The intermediate disc 17 in this case has been omitted, its function being assumed directly by the clutch disc 5' which carries the friction liner 18', which is arranged to come into contact with the inner face of the radial wall 2'a of the impulse wheel casing 2'. By contrast to the foregoing embodiment, the disc 5' is then driven in rotation only while the pressure of the hydraulic fluid in the chamber 11' is diminishing, by frictional contact of its liner 18' on the radial wall 2'a. The disc 5' is provided at its periphery with profiled lugs 19' and 21' similar to the lugs 19 and 21 of the intermediate disc 17 in the foregoing embodiment, and will thus be able to drive the turbine wheel 1 in rotation through the springs 22 as before. The arched seatings 24 will be able to be in all ways similar to those in the embodiment of FIGS. 1 to 3.

Figure 5:
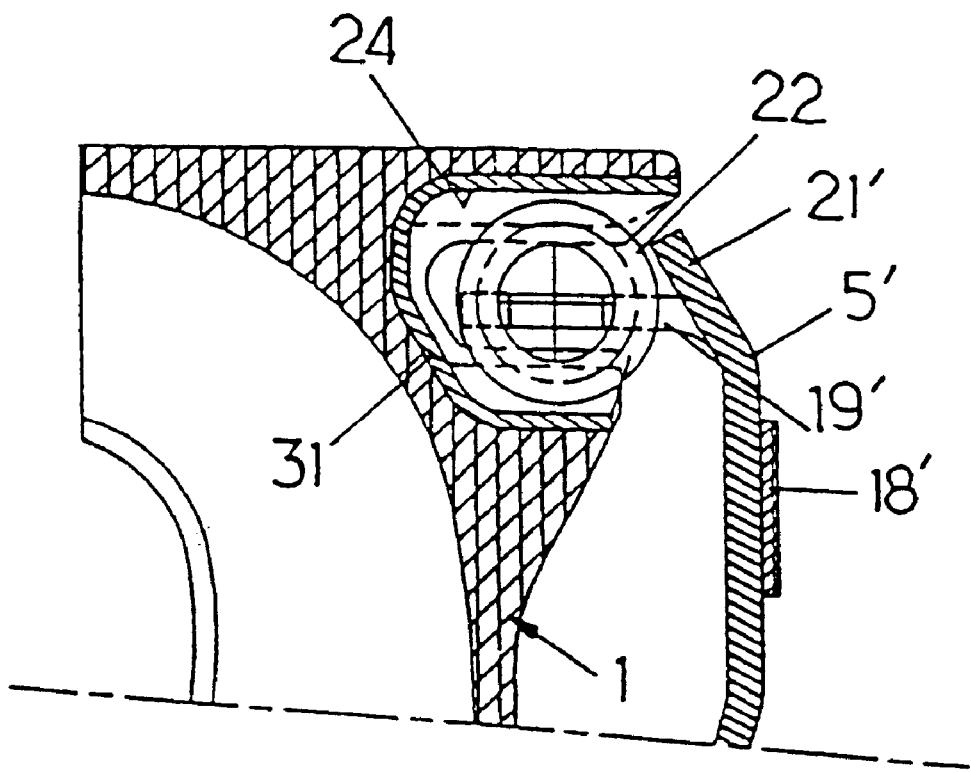
FIG. 5 is a partial view in axial cross section showing the formation of the arched seatings which are entirely in the form of metallic inserts.

In the further version in FIG. 5, however, the possibility is illustrated of constituting the arched seatings by metallic inserts 31, on which the mouldable material of the turbine 1 is applied by in situ moulding, which further reduces embedding of the springs 22 in this material under the effect of peripheral or centrifugal forces which are exerted on them in the course of operation.

This embodiment of the seatings 24 could however also be adopted with the embodiment of FIGS. 1 to 3.

The internal toroidal portion 29 is not indispensable. In this connection, in this example the turbine wheel 1 comprises an external toroidal portion which is thickened so as to define the arched seatings in accordance with the invention. The blades 30 are formed integrally by moulding with the external toroidal portion, in such a way that internal toroidal portion may be dispensed with. It is of course possible to provide a toothed crown or a toothed disc to replace the internal toroidal portion 29 and to stabilise the blades 30, the teeth acting as spacers between the blades.

What is claimed is:

1. A hydrokinetic coupling apparatus, including a turbine wheel (1) which is capable of being coupled fixedly to a driven shaft and which is mounted within an impulse wheel casing (2), with which it is able to cooperate for the hydrokinetic transmission of a torque to the said driven shaft from a driving shaft which is able to be coupled fixedly to the said impulse wheel, the said apparatus further including a clutch device having a clutch disc (5), being a so-called lock-up clutch, adapted to lock or unlock an elastic coupling between the said turbine wheel (1) and a radial wall (2a) of the said casing, through a set of circumferentially acting helical damping springs (22) which are held in place in arched seatings (24) which are fixed with respect to the said turbine wheel (1) and which are open in an axial direction towards the said radial wall (2a), characterised in that the said arched seatings (24) are formed directly in a thickened peripheral portion (25) of the turbine wheel (1) made of mouldable material, and said thickened peripheral portion is disposed radially outside a hub provided for connection to said driven shaft, opposed radial ends (26) of the said seatings (24) serving as abutments for the corresponding ends of the said springs (22).

2. Apparatus according to claim 1, characterised in that the said mouldable material is synthetic material.

3. Apparatus according to claim 1, characterised in that the said mouldable material is aluminium.

4. Apparatus according to claim 1, characterised in that the said turbine wheel (1) is made entirely of moulded material, including its hub for connection to the said driven shaft, the said hub mating with a metallic disc for coupling said hub in rotation with the driven shaft.

5. Apparatus according to claim 1, characterised in that the said mouldable material is moulded in situ on a central metallic disc (23) for connection to the said driven shaft.

6. Apparatus according to claim 1, characterised in that the said radial ends (26) and/or the external walls of the arched seatings (24) consist of metallic thrust pieces (28) on which the said mouldable material is moulded.

7. Apparatus according to claim 1, characterised in that each of the said seatings (24) consists of a metallic insert (31), with the mouldable material of the turbine wheel (1) being moulded in situ on the inserts.

* * * * *